(12) United States Patent
Ha

(10) Patent No.: US 7,889,795 B2
(45) Date of Patent: Feb. 15, 2011

(54) METHOD AND APPARATUS FOR MOTION ESTIMATION

(75) Inventor: Tae-hyeun Ha, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1423 days.

(21) Appl. No.: 11/338,745

(22) Filed: Jan. 25, 2006

(65) Prior Publication Data

US 2006/0171464 A1   Aug. 3, 2006

(30) Foreign Application Priority Data

Feb. 3, 2005   (KR) ...................... 10-2005-0010228

(51) Int. Cl.
*H04N 11/02* (2006.01)
(52) U.S. Cl. ............................ 375/240.17; 375/240.12; 375/240.24; 375/240.13; 375/240.01; 375/240.16
(58) Field of Classification Search ............ 375/240.01, 375/240.16, 24.013, 240.26
See application file for complete search history.

(56) References Cited

U.S. PATENT DOCUMENTS

| | | | | |
|---|---|---|---|---|
| 5,712,799 A | * | 1/1998 | Farmwald et al. | 345/475 |
| 5,742,710 A | * | 4/1998 | Hsu et al. | 382/236 |
| 5,987,178 A | * | 11/1999 | Anesko et al. | 382/236 |
| 7,260,148 B2 | * | 8/2007 | Sohm | 375/240.16 |
| 2003/0231366 A1 | * | 12/2003 | Lin | 358/519 |
| 2004/0247031 A1 | * | 12/2004 | Hagai et al. | 375/240.16 |
| 2006/0039477 A1 | * | 2/2006 | Christiansen | 375/240.16 |
| 2006/0072790 A1 | * | 4/2006 | Wittebrood et al. | 382/107 |
| 2006/0083310 A1 | * | 4/2006 | Zhang | 375/240.16 |

FOREIGN PATENT DOCUMENTS

| | | |
|---|---|---|
| JP | 09-163380 A | 6/1997 |
| KR | 10-2003-0007087 A | 1/2003 |
| KR | 10-2004-0079086 A | 9/2004 |

\* cited by examiner

*Primary Examiner*—Chieh M Fan
*Assistant Examiner*—Siu M Lee
(74) *Attorney, Agent, or Firm*—Sughrue Mion, PLLC

(57) ABSTRACT

A method and apparatus for motion estimation in which the amount of computation can be reduced are provided. The method for motion estimation includes storing an interblock match difference calculated for a previous matching block to be motion estimated, calculating an interblock match difference for a current matching block to be motion estimated using the stored interblock match difference, and performing motion estimation on the current matching block using the interblock match difference calculated for the current matching block.

18 Claims, 16 Drawing Sheets

$SAD_{1,1} = |S_{1,1} - R_{1,1}| + \ldots + |S_{1,16} - R_{1,16}| + |S_{1,17} - R_{1,17}| + \ldots + |S_{1,32} - R_{1,32}|$
$+ |S_{2,1} - R_{2,1}| + \ldots + |S_{2,16} - R_{2,16}| + |S_{2,17} - R_{2,17}| + \ldots + |S_{2,32} - R_{2,32}|$
$+ \ldots \ldots$
$+ |S_{32,1} - R_{32,1}| + \ldots + |S_{32,16} - R_{32,16}| + |S_{32,17} - R_{32,17}| + \ldots |S_{32,32} - R_{32,32}|$ $SAD_{1,2} = |S_{1,1} - R_{1,2}| + \ldots + |S_{1,16} - R_{1,17}| + |S_{1,17} - R_{1,18}| + \ldots + |S_{1,32} - R_{1,33}|$
$+ |S_{2,1} - R_{2,2}| + \ldots + |S_{2,16} - R_{2,17}| + |S_{2,17} - R_{2,18}| + \ldots + |S_{2,32} - R_{2,33}|$
$+ \ldots \ldots$
$+ |S_{32,1} - R_{32,2}| + \ldots + |S_{32,16} - R_{32,17}| + |S_{32,17} - R_{32,18}| + \ldots |S_{32,32} - R_{32,33}|$ $SAD_{2,1} = |S_{1,1} - R_{2,1}| + \ldots + |S_{1,16} - R_{2,16}| + |S_{1,17} - R_{2,17}| + \ldots + |S_{1,32} - R_{2,32}|$
$+ |S_{2,1} - R_{3,1}| + \ldots + |S_{2,16} - R_{3,16}| + |S_{2,17} - R_{3,17}| + \ldots + |S_{2,32} - R_{3,32}|$
$+ \ldots\ldots$
$+ |S_{32,1} - R_{33,1}| + \ldots + |S_{32,16} - R_{33,16}| + |S_{32,17} - R_{33,17}| + \ldots |S_{32,32} - R_{33,32}|$ $SAD_{32,32} = |S_{1,1} - R_{32,32}| + \ldots + |S_{1,16} - R_{32,48}| + |S_{1,17} - R_{32,49}| + \ldots + |S_{1,32} - R_{32,64}|$
$+ |S_{2,1} - R_{33,32}| + \ldots + |S_{2,16} - R_{33,48}| + |S_{2,17} - R_{33,49}| + \ldots + |S_{2,32} - R_{33,64}|$
$+ \ldots\ldots$
$+ |S_{32,1} - R_{64,32}| + \ldots + |S_{32,16} - R_{64,48}| + |S_{32,17} - R_{64,49}| + \ldots |S_{32,32} - R_{64,64}|$ $SAD_{1,1} = |S_{1,17}-R_{1,17}| + \ldots + |S_{1,32}-R_{1,32}| + |S_{1,33}-R_{1,33}| + \ldots + |S_{1,48}-R_{1,48}|$
$+ |S_{2,17}-R_{2,17}| ++ \ldots + |S_{2,32}-R_{2,32}| + |S_{2,33}-R_{2,33}| + \ldots + |S_{2,48}-R_{2,48}|$
$+ \ldots \ldots +$
$+ |S_{32,17}-R_{32,17}| + \ldots + |S_{32,32}-R_{32,32}| + |S_{32,33}-R_{32,33}| + \ldots |S_{32,48}-R_{32,48}|$ $$SAD_{1,2} = |S_{1,17} - R_{1,18}| + \ldots + |S_{1,32} - R_{1,33}| + |S_{1,33} - R_{1,34}| + \ldots + |S_{1,48} - R_{1,49}|$$
$$+ |S_{2,17} - R_{2,18}| + \ldots + |S_{2,32} - R_{2,33}| + |S_{2,33} - R_{2,34}| + \ldots + |S_{2,48} - R_{2,49}| +$$
$$\ldots \ldots$$
$$+ |S_{32,17} - R_{32,18}| + \ldots + |S_{32,32} - R_{32,33}| + |S_{32,33} - R_{32,34}| + \ldots |S_{32,48} - R_{32,49}|$$

$SAD_{2,1} = |S_{1,17}-R_{2,17}| + \ldots + |S_{1,32}-R_{2,32}| + |S_{1,33}-R_{2,33}| + \ldots + |S_{1,48}-R_{2,48}| +$
$\quad |S_{2,17}-R_{3,17}| + \ldots + |S_{2,32}-R_{3,32}| + |S_{2,33}-R_{3,33}| + \ldots + |S_{2,48}-R_{3,48}| +$
$\quad \ldots \ldots$
$\quad + |S_{32,17}-R_{33,17}| + \ldots + |S_{32,32}-R_{33,32}| + |S_{32,33}-R_{33,33}| + \ldots |S_{32,48}-R_{33,48}|$ $SAD_{32,32} = | S_{1,17} - R_{33,49} | + \ldots + | S_{1,32} - R_{33,64} | + | S_{1,33} - R_{33,65} | + \ldots + | S_{1,48} - R_{33,80} |$
$+ | S_{2,17} - R_{34,49} | + \ldots + | S_{2,32} - R_{34,64} | + | S_{2,33} - R_{34,65} | + \ldots + | S_{2,48} - R_{34,80} |$
$+ \ldots \ldots$
$+ | S_{32,17} - R_{64,49} | + \ldots + | S_{32,32} - R_{64,64} | + | S_{32,33} - R_{64,65} | + \ldots + | S_{32,48} - R_{64,80} |$

FIG. 13

$SAD(PREVIOUS)_{1,1} =$
1305 — $|S_{1,1}-R_{1,1}| + \ldots + |S_{1,16}-R_{1,16}|$
$+ |S_{2,1}-R_{2,1}| + \ldots + |S_{2,16}-R_{2,16}|$
$+ \ldots$
$+ |S_{32,1}-R_{32,1}| + \ldots + |S_{32,16}-R_{32,16}|$ $+$ 1310 — $|S_{1,17}-R_{1,17}| + \ldots + |S_{1,32}-R_{1,32}|$
$|S_{2,17}-R_{2,17}| + \ldots + |S_{2,32}-R_{2,32}|$
$|S_{32,17}-R_{32,17}| + \ldots |S_{32,32}-R_{32,32}|$ $SAD(CURRENT)_{1,1} =$
1315 — $|S_{1,17}-R_{1,17}| + \ldots + |S_{1,32}-R_{1,32}|$
$+ |S_{2,17}-R_{2,17}| + \ldots + |S_{2,32}-R_{2,32}|$
$+ \ldots +$
$+ |S_{32,17}-R_{32,17}| + \ldots + |S_{32,32}-R_{32,32}|$ $+$ 1320 — $|S_{1,33}-R_{1,33}| + \ldots + |S_{1,48}-R_{1,48}|$
$|S_{2,33}-R_{2,33}| + \ldots + |S_{2,48}-R_{2,48}|$
$|S_{32,33}-R_{32,33}| + \ldots |S_{32,48}-R_{32,48}|$ $SAD(PREVIOUS)_{1,2} =$
1325 — $|S_{1,1}-R_{1,2}| + \ldots + |S_{1,16}-R_{1,17}|$
$+ |S_{2,1}-R_{2,2}| + \ldots + |S_{2,16}-R_{2,17}|$
$+ \ldots$
$+ |S_{32,1}-R_{32,2}| + \ldots + |S_{32,16}-R_{32,17}|$ $+$ 1330 — $|S_{1,17}-R_{1,18}| + \ldots + |S_{1,32}-R_{1,33}|$
$|S_{2,17}-R_{2,18}| + \ldots + |S_{2,32}-R_{2,33}|$
$|S_{32,17}-R_{32,18}| + \ldots |S_{32,32}-R_{32,33}|$ $SAD(CURRENT)_{1,2} =$
1335 — $|S_{1,17}-R_{1,18}| + \ldots + |S_{1,32}-R_{1,33}|$
$+ |S_{2,17}-R_{2,18}| + \ldots + |S_{2,32}-R_{2,33}|$
$+ \ldots$
$+ |S_{32,17}-R_{32,18}| + \ldots + |S_{32,32}-R_{32,33}|$ $+$ 1340 — $|S_{1,33}-R_{1,34}| + \ldots + |S_{1,48}-R_{1,49}|$
$|S_{2,33}-R_{2,34}| + \ldots + |S_{2,48}-R_{2,49}|$
$|S_{32,33}-R_{32,34}| + \ldots |S_{32,48}-R_{32,49}|$ $SAD(PREVIOUS)_{2,1} =$
1345 — $|S_{1,1}-R_{2,1}| + \ldots + |S_{1,16}-R_{2,16}|$
$+ |S_{2,1}-R_{3,1}| + \ldots + |S_{2,16}-R_{3,16}|$
$+ \ldots$
$+ |S_{32,1}-R_{33,1}| + \ldots + |S_{32,16}-R_{33,16}|$ $+$ 1350 — $|S_{1,17}-R_{2,17}| + \ldots + |S_{1,32}-R_{2,32}|$
$|S_{2,17}-R_{3,17}| + \ldots + |S_{2,32}-R_{3,32}|$
$|S_{32,17}-R_{33,17}| + \ldots |S_{32,32}-R_{33,32}|$ $SAD(CURRENT)_{2,1} =$
1355 — $|S_{1,17}-R_{2,17}| + \ldots + |S_{1,32}-R_{2,32}|$
$+ |S_{2,17}-R_{3,17}| + \ldots + |S_{2,32}-R_{3,32}|$
$+ \ldots$
$+ |S_{32,17}-R_{33,17}| + \ldots + |S_{32,32}-R_{33,32}|$ $+$ 1360 — $|S_{1,33}-R_{2,33}| + \ldots + |S_{1,48}-R_{2,48}|$
$|S_{2,33}-R_{3,33}| + \ldots + |S_{2,48}-R_{3,48}|$
$|S_{32,33}-R_{33,33}| + \ldots |S_{32,48}-R_{33,48}|$ $SAD(PREVIOUS)_{32,32} =$
1365 — $|S_{1,1}-R_{32,32}| + \ldots + |S_{1,16}-R_{32,48}|$
$+ |S_{2,1}-R_{33,32}| + \ldots + |S_{2,16}-R_{33,48}|$
$+ \ldots$
$+ |S_{32,1}-R_{64,32}| + \ldots + |S_{32,16}-R_{64,48}|$ $+$ 1370 — $|S_{1,17}-R_{32,49}| + \ldots + |S_{1,32}-R_{32,64}|$
$|S_{2,17}-R_{33,49}| + \ldots + |S_{2,32}-R_{33,64}|$
$|S_{32,17}-R_{64,49}| + \ldots + |S_{32,32}-R_{64,64}|$ $SAD(CURRENT)_{32,32} =$
1375 — $|S_{1,17}-R_{33,49}| + \ldots + |S_{1,32}-R_{33,64}|$
$+ |S_{2,17}-R_{34,49}| + \ldots + |S_{2,32}-R_{34,64}|$
$+ \ldots$
$+ |S_{32,17}-R_{64,49}| + \ldots + |S_{32,32}-R_{64,64}|$ $+$ 1380 — $|S_{1,33}-R_{33,65}| + \ldots + |S_{1,48}-R_{33,80}|$
$|S_{2,33}-R_{34,65}| + \ldots + |S_{2,48}-R_{34,80}|$
$|S_{32,33}-R_{64,65}| + \ldots + |S_{32,48}-R_{64,80}|$

METHOD AND APPARATUS FOR MOTION ESTIMATION

CROSS-REFERENCE TO RELATED PATENT APPLICATION

This application claims priority from Korean Patent Application No. 10-2005-0010228, filed on Feb. 3, 2005, in the Korean Intellectual Property Office, the disclosure of which is incorporated herein in its entirety by reference.

BACKGROUND OF THE INVENTION

1. Field of the Invention

The present invention relates to a method and apparatus for motion estimation.

2. Description of the Related Art

Typically, personal computers (PC) or high-definition televisions (HDTV) perform frame rate conversion to be compatible with programs that follow various broadcasting standards such as the Phase Alternation Line (PAL) or the National Television System Committee (NTSC). Frame rate conversion (FRC) is the act of changing the number of frames per second. In particular, it is necessary to interpolate a new frame when a frame rate increases.

With recent advances in broadcasting technologies, frame rate conversion is performed after video data is compressed according to video compression standards such as Moving Picture Experts Group (MPEG) and H.263. In the field of video processing, video signals usually have redundancies due to their high autocorrelation. Data compression efficiency can be improved by removing redundancies during data compression. Here, in order to efficiently compress a video frame that changes temporally, it is necessary to remove redundancies in the time-axis direction.

Removal of redundancies in the time-axis direction is based on an idea that the amount of data to be transmitted can be greatly reduced by replacing a frame showing no movement or slight movement with a previous frame.

To this end, the act of searching for a block in a previous frame that is most similar to a block in a current frame is required, which is referred to as motion estimation (ME). A motion vector (MV) is a variable indicating how much a block has moved.

For motion estimation, a block matching algorithm (BMA) is generally used based on the accuracy of the amount of motion, a possibility of real-time processing, and hardware implementation. Generation of an intermediate image between frames for FRC uses the BMA described above and can be simply expressed as shown in FIG. 1.

Referring to FIG. 1, to interpolate an intermediate image frame $F_i$ between a previous frame $F_{n-1}$ and a current frame $F_n$, a block B of the intermediate image frame $F_i$ is generated through motion estimation between a block B of the previous frame $F_{n-1}$ and a block B of the current frame $F_n$.

Since the BMA is easy to implement and is suitable for real-time processing, it is used in not only FRC but also compression standards such as MPEG2/4 and H.262/264. Although the BMA exhibits superior performance in horizontal and/or vertical motion estimation, its performance is poor in rotation or enlargement/reduction of an image.

To improve the accuracy of motion estimation in the use of the BMA, the size of a matching block should be increased. The increase in a block size not only improves accuracy, but also increases the amount of computation and makes precise representation difficult. On the other hand, a decrease in a block size not only reduces the amount of computation and makes precise representation possible, but also degrades accuracy.

Among conventional techniques for improving matching accuracy and allowing precise representation, there is a technique for motion estimation using a block having a guard block. In the technique, an M×M block is used for motion estimation and an N×N block is used for motion compensation as shown in FIG. 2A.

Referring to FIG. 2B, motion estimation is performed using an M×M block having a guard block, and the actual motion compensation is performed using an N×N motion compensation block. Thus, matching accuracy is improved and representation precision can be improved through interpolation using an N×N block. However, such a technique still increases the amount of computation.

SUMMARY OF THE INVENTION

The present invention provides a method and apparatus for motion estimation, in which the amount of computation is reduced.

According to an aspect of the present invention, there is provided a method for motion estimation. The method comprises storing an interblock match difference calculated for a previous matching block to be motion estimated, calculating a match difference for a current matching block to be motion estimated using the stored interblock match difference, and performing motion estimation on the current matching block using the interblock match difference calculated for the current matching block.

The previous matching block or the current matching block is larger than a block to be motion compensated.

The interblock match difference for the current matching block or the previous matching block is calculated by sampling pixels from the current matching block or the previous matching block.

According to another aspect of the present invention, there is provided a method for motion estimation. The method comprises reading a right half of an interblock match difference for a previous matching block from a memory, calculating a right half of an interblock match difference for a current matching block to be motion estimated, adding the read right half and the calculated right half to obtain the interblock match difference for the current matching block, and performing motion estimation on the current matching block using the obtained interblock match difference.

Performing the motion estimation comprises determining a search block having the smallest interblock match difference among interblock match differences obtained in the entire search area and determining a motion vector based on the determined search block and the current search block.

According to still another aspect of the present invention, there is provided an apparatus for motion estimation. The apparatus comprises a storing unit, a predicting unit, and a motion vector determining unit. The storing unit stores an interblock match difference calculated for a previous matching block. The predicting unit calculates an interblock match difference for a current matching block to be motion estimated using the stored interblock match difference. The motion vector determines unit performing motion estimation on the current matching block using the interblock match difference calculated for the current matching block.

According to yet another aspect of the present invention, there is provided an apparatus for motion estimation. The apparatus comprises a match difference storing unit, a predicting unit, and a motion vector determining unit. The match difference storing unit stores a right half of an interblock match difference for a previous matching block. The predicting unit calculates a right half of an interblock match difference for a current matching block or the previous matching block to be motion estimated and adds the read right half and the calculated right half to obtain the interblock match difference for the current matching block or the previous matching block. The motion vector determining unit performs motion estimation on the current matching block using the obtained interblock match difference.

BRIEF DESCRIPTION OF THE DRAWINGS

The above and other aspects of the present invention will become more apparent by describing in detail an exemplary embodiment thereof with reference to the attached drawings in which:

FIG. 13 is a reference view for explaining parts of equations for calculation of SADs for the previous matching block and the current matching block that are subject to identical calculations according to examples shown in FIGS. 5A through 12B;

DETAILED DESCRIPTION OF THE INVENTION

Figure 1:
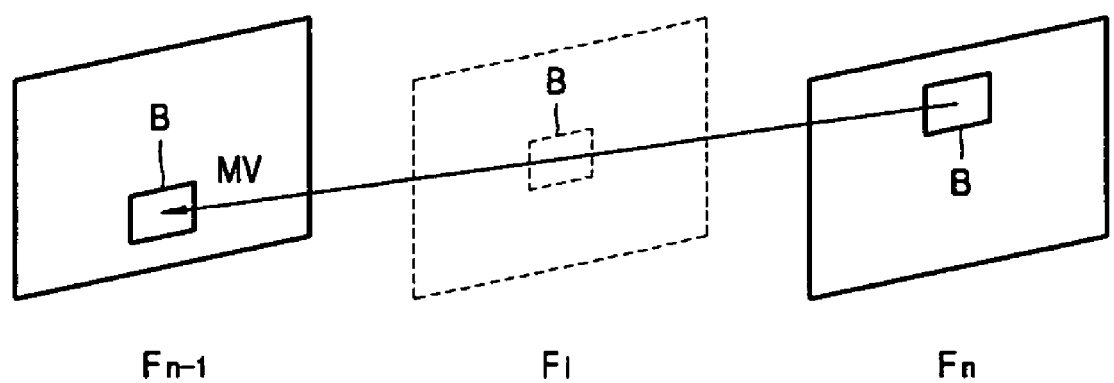
FIG. 1 is a conceptual view for explaining interpolation between frames through motion estimation according to the related art.
Figure 2A:
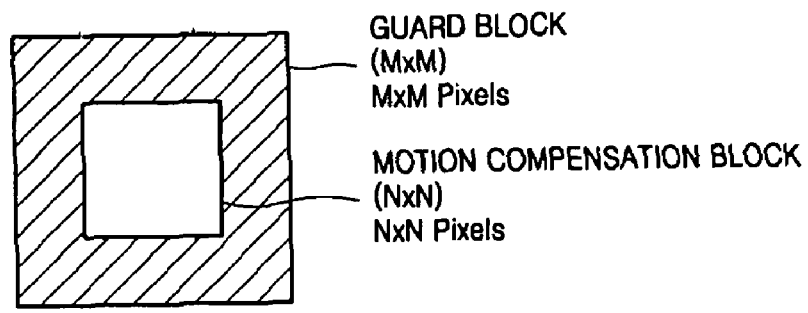
FIG. 2A is a view for explaining a concept of a guard block used in motion estimation according to the related art.
Figure 2B:
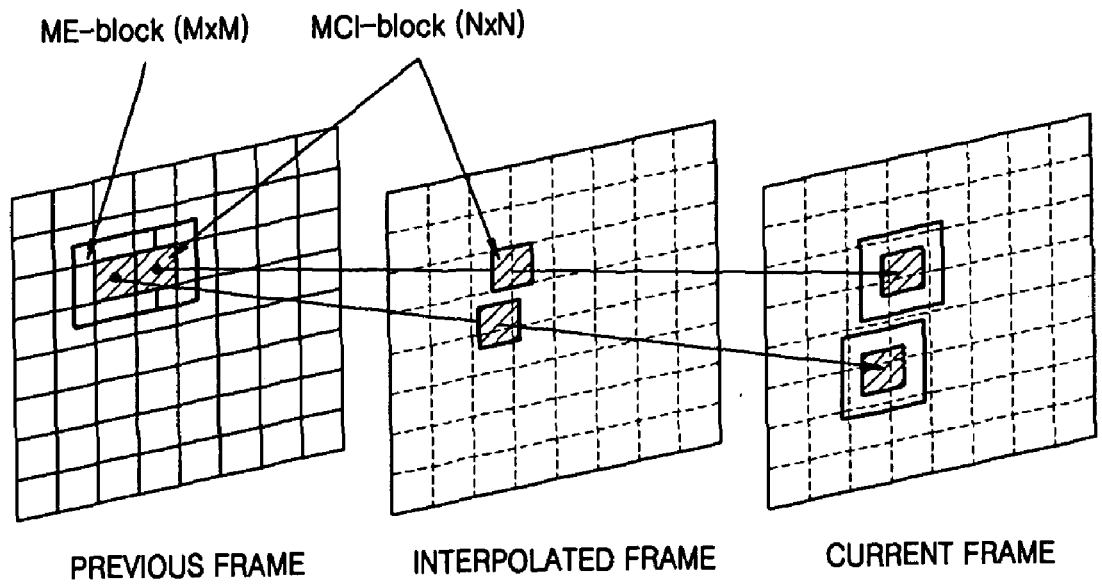
FIG. 2B is a conceptual view for explaining interpolation between frames through motion estimation using the guard block according to the related art.
Figure 3:
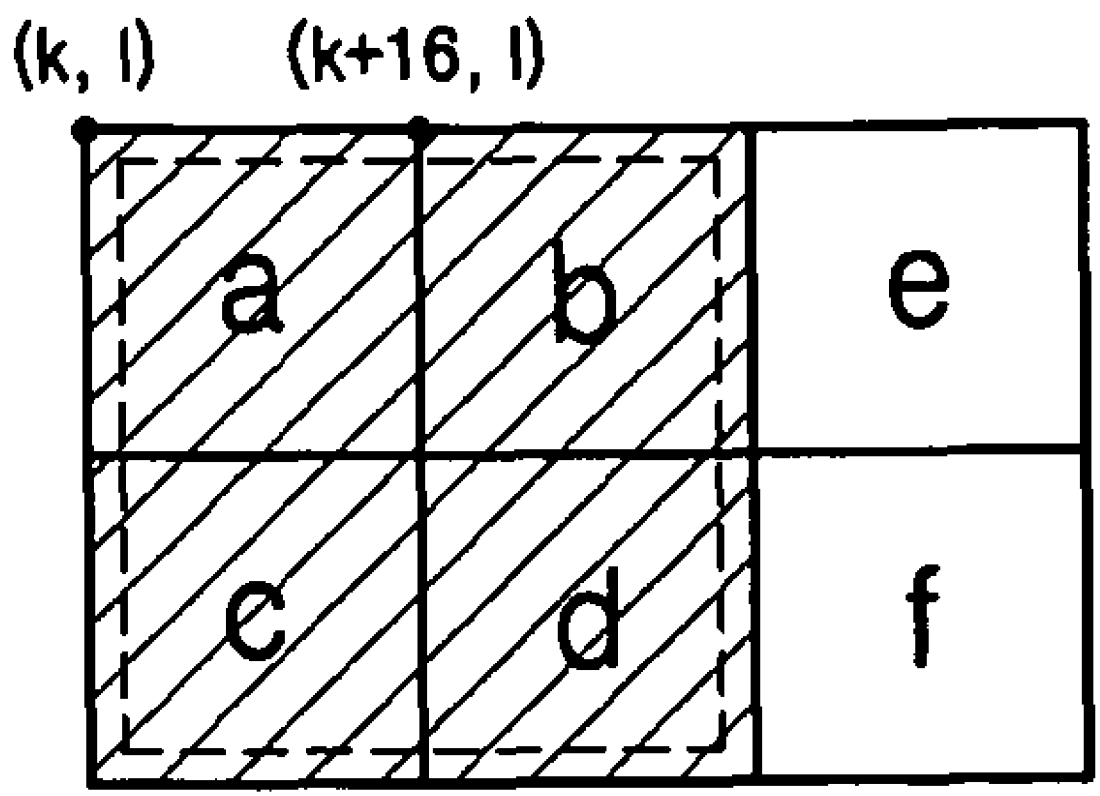
FIG. 3 illustrates a matching block for calculation of a sum of absolute differences (SAD) according to the present invention.

FIG. 3 illustrates a matching block for calculation of a sum of absolute differences (SAD) according to the present invention.

Referring to FIG. 3, a block composed of sub-blocks a, b, c, and d, which is marked with dotted lines, indicates a matching block (i.e., a previous matching block) that has been previously calculated and a block composed of sub-blocks b, d, e, and f indicates a matching block (i.e., a current matching block) that is to be currently calculated. Here, since the sub-blocks b and d of the previous matching block and the current matching block overlap, an SAD for the current matching block composed of b, d, e, and f can be obtained by calculating only an SAD for the sub-blocks e and f using an already calculated SAD for the sub-blocks b and d. An SAD is a difference between a matching block and a search block and, more specifically, a sum of absolute differences between pixels of the matching block and pixels of the search block.

First, a principle of reducing the amount of computation using equations will now be described.

An SAD for the previous matching block is given by $$SAD_{(k,l)}(x, y) = \sum_{i=1}^{32}\sum_{j=1}^{32} |f_n(k+i+x, l+j+y) - f_{n-1}(k+i, l+j)|$$

where (k, l) represents coordinates of a pixel at the top-left corner of a previous matching block, i and j represent an x-axis index and y-axis index of points included in the previous matching block, respectively, $f_n$ represents a current frame, and $f_{n-1}$ represents a previous frame that is adjacent to the current frame. To sum up, $f_n$ (k+i+x, l+j+y) represents pixel values included in a matching block when coordinates of a pixel at the top-left corner of the matching block are (k, l) and $f_{n-1}$ (k+i, l+j) represents pixel values included in a search block for the matching block.

An SAD for the current matching block is expressed as $$SAD_{(k+16,l)}(x, y) = \sum_{i=1}^{32}\sum_{j=1}^{32} |f_n(k + 16 + i + x, l + j + y) - f_{n-1}(k + i, l + j)|$$

A result of subtracting the SAD for the previous matching block from the SAD for the current matching block can be expressed as $$SAD_{(k+16,l)}(x, y) - SAD_{(k,l)}(x, y) =$$

$$\sum_{i=1}^{32}\sum_{j=1}^{32} S_{(i,j)}(k + 16, l) - \sum_{i=1}^{32}\sum_{j=1}^{32} S_{(i,j)}(k, l)$$

if, $S_{(i,j)}(k, l) \equiv |f_n(k + i + x, l + j + y) - f_{n-1}(k + i, l + j)|$ $S_{(i,j)}(k + 16, l) =$ $|f_n(k + 16 + i + x, l + j + y) - f_{n-1}(k + 16 + i, l + j)| = S_{(i+16,j)}(k, l)$ Thus, the result can be arranged and developed as follows.

$$SAD_{(k+16,l)}(x, y) - SAD_{(k,l)}(x, y) =$$

$$\sum_{i=1}^{32}\sum_{j=1}^{32} S_{(i,j)}(k + 16, l) - \sum_{i=1}^{32}\sum_{j=1}^{32} S_{(i,j)}(k, l)$$

$$= \sum_{i=1}^{32}\sum_{j=1}^{32} S_{(i+16,j)}(k, l) - \sum_{i=1}^{32}\sum_{j=1}^{32} S_{(i,j)}(k, l) =$$

$$\sum_{i=33}^{48}\sum_{j=1}^{32} S_{(i,j)}(k, l) - \sum_{i=1}^{16}\sum_{j=1}^{32} S_{(i,j)}(k, l)$$

$$\because \sum_{m=33}^{48}\sum_{j=1}^{32} S_{(m,j)}(k, l) = \sum_{m=17}^{32}\sum_{j=1}^{32} S_{(m,j)}(k, l) + \sum_{m=33}^{48}\sum_{j=1}^{32} S_{(m,j)}(k, l)$$

$$\sum_{i=1}^{32}\sum_{j=1}^{32} S_{(i,j)}(k, l) = \sum_{i=1}^{16}\sum_{j=1}^{32} S_{(i,j)}(k, l) + \sum_{i=17}^{32}\sum_{j=1}^{32} S_{(i,j)}(k, l)$$

$$SAD_{(k+16,l)}(x, y) = SAD_{(k,l)}(x, y) + \sum_{i=33}^{48}\sum_{j=1}^{32} S_{(i,j)}(k, l) - \sum_{i=1}^{16}\sum_{j=1}^{32} S_{(i,j)}(k, l)$$

Thus, by re-arranging the above equation, the SAD for the current matching block can be divided into a part 1 and a part 2 as follows.

$$\therefore SAD_{(k+16,l)}(x, y) = \underbrace{\sum_{i=17}^{32}\sum_{j=1}^{32} S_{(i,j)}(k, l)}_{PART1} - \underbrace{\sum_{i=33}^{48}\sum_{j=1}^{32} S_{(i,j)}(k, l)}_{PART2}$$

As can be seen from the above equation, the part 1 is a left half of the SAD for the current matching block and the part 2 is a right half of the SAD for the current matching block.

The part 1 which is the left half of the SAD for the current matching block, corresponds to a right half of the SAD for the previous matching block. Thus, in the present invention, a result of calculation of the right half of the SAD for the previous matching block is stored and the stored result is used for calculation of the SAD for the current matching block.

Overlapped calculations will now be described with examples.

Figure 4A:
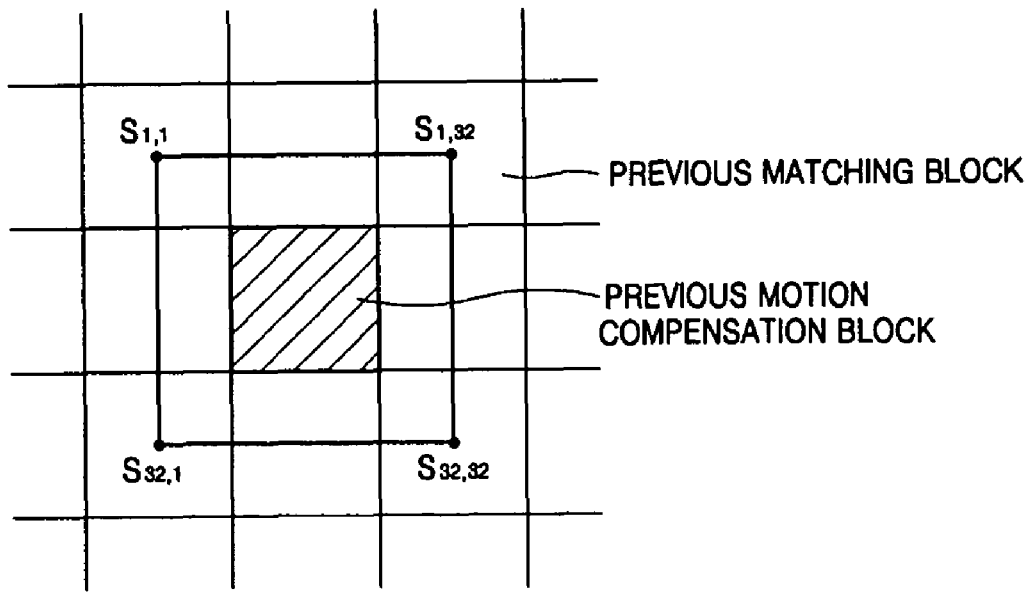
FIGS. 4A and 4B illustrate a previous matching block and a current matching block for motion estimation according to the present invention.

FIG. 4A illustrates a previous matching block for motion estimation according to the present invention.

Referring to FIG. 4A, a block to be matched includes a previous motion compensation block and overlapping portions adjacent to the previous motion compensation block and is formed by four points $S_{1,1}$, $S_{1,32}$, $S_{32,1}$, and $S_{32,32}$.

Figure 4B:
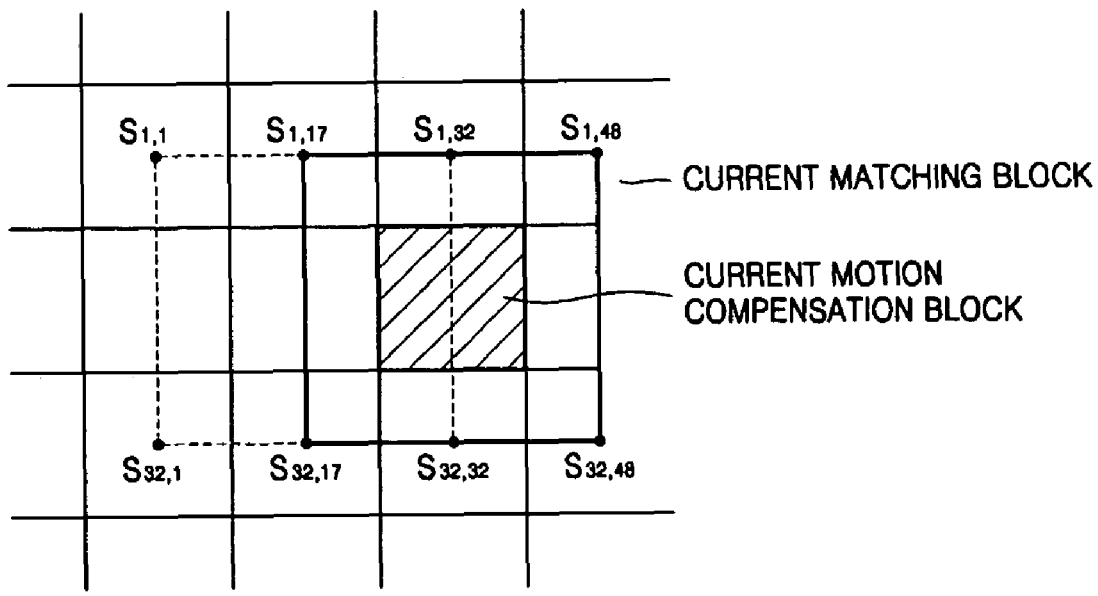

FIG. 4B illustrates a current matching block for motion estimation according to the present invention.

Referring to FIG. 4B, a block to be matched includes a current motion compensation block and overlapping portions adjacent to the current motion compensation block and is formed by four points $S_{1,17}$, $S_{1,48}$, $S_{32,17}$, and $S_{32,48}$.

FIGS. 5A through 8B illustrate positions of search blocks in a search area for a previous matching block and SADs according to the positions.

Figures 5A, 5B:
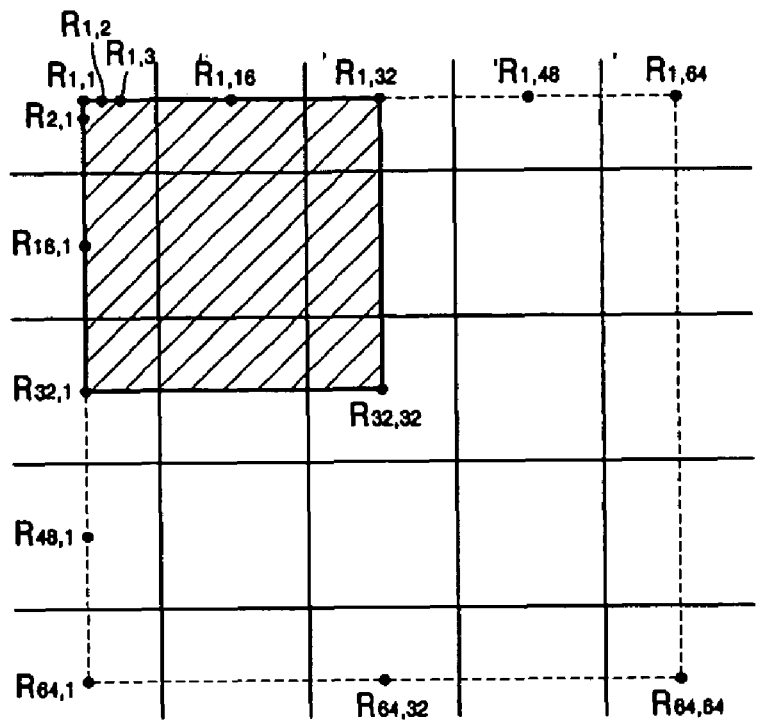
FIG. 5A illustrates a search area for a previous matching block for calculation of an SAD and a first search block in the search area.
FIG. 5B illustrates an equation for calculation of an SAD based on the first search block shown in FIG. 5A and the previous matching block.

FIG. 5A illustrates a search area for a previous matching block for calculation of an SAD and a position of a first search block in the search area.

Referring to FIG. 5A, a search area for a previous matching block is formed by $R_{1,1}$, $R_{1,64}$, $R_{64,1}$, and $R_{64,64}$ and a first search block that is first searched in the search area is formed by $R_{1,1}$, $R_{1,32}$, $R_{32,1}$, and $R_{32,32}$.

FIG. 5B illustrates an equation for calculation of the SAD based on the first search block and the previous matching block shown in FIG. 5A.

$$SAD(previous)_{1,1} = |S_{1,1} - R_{1,1}| + |S_{1,2} - R_{1,2}| + \ldots + |S_{1,16} - R_{1,16}|$$
$$+ |S_{1,17} - R_{1,17}| + \ldots +$$
$$|S_{1,32} - R_{1,32}| + |S_{2,1} - R_{2,1}| + |S_{2,2} - R_{2,2}| +$$
$$\ldots + |S_{2,16} - R_{2,16}| + |S_{2,17} - R_{2,17}| + \ldots +$$
$$|S_{2,32} - R_{2,32}| + \ldots + |S_{32,1} - R_{32,1}| +$$
$$|S_{32,2} - R_{32,2}| + \ldots + |S_{32,16} - R_{32,16}| +$$
$$|S_{32,17} - R_{32,17}| + \ldots + |S_{32,32} - R_{32,32}|$$

Figures 6A, 6B:
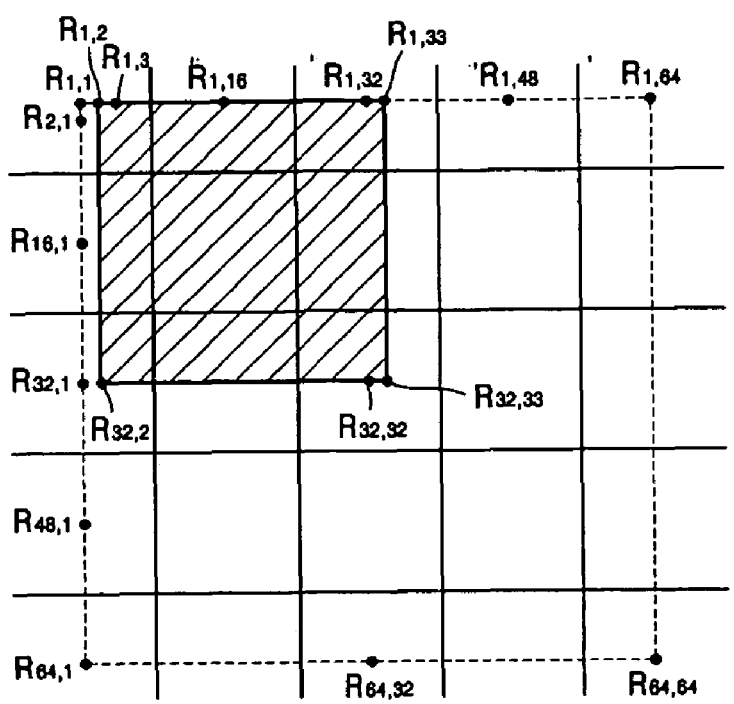
FIG. 6A illustrates the search area for the previous matching block for calculation of an SAD and a position of a search block that is moved from the first search block shown in FIG. 5A by 1 along the x-axis in the search area.
FIG. 6B illustrates an equation for calculation of an SAD based on the search block shown in FIG. 6A and the previous matching block.

FIG. 6A illustrates the search area for the previous matching block for calculation of an SAD and a position of a search block that is moved from the first search block by 1 along the x-axis in the search area.

Referring to FIG. 6A, the search block that is moved from the position of the first search block by 1 along the x-axis is formed by $R_{1,2}$, $R_{1,33}$, $R_{32,2}$, and $R_{32,33}$.

FIG. 6B illustrates an equation for calculation of an SAD based on the search block shown in FIG. 6A and the previous matching block.

$$SAD(previous)_{1,2} = |S_{1,1} - R_{1,2}| + |S_{1,2} - R_{1,3}| + \ldots + |S_{1,16} - R_{1,17}|$$
$$+ |S_{1,17} - R_{1,18}| + \ldots +$$
$$|S_{1,32} - R_{1,33}| + |S_{2,1} - R_{2,2}| + |S_{2,2} - R_{2,3}| +$$
$$\ldots + |S_{2,16} - R_{2,17}| + |S_{2,17} - R_{2,18}| + \ldots +$$
$$|S_{2,32} - R_{2,33}| + \ldots + |S_{32,1} - R_{32,2}| +$$
$$|S_{32,2} - R_{32,3}| + \ldots + |S_{32,16} - R_{32,17}| +$$
$$|S_{32,17} - R_{32,18}| + \ldots |S_{32,32} - R_{32,33}|$$

Figures 7A, 7B:
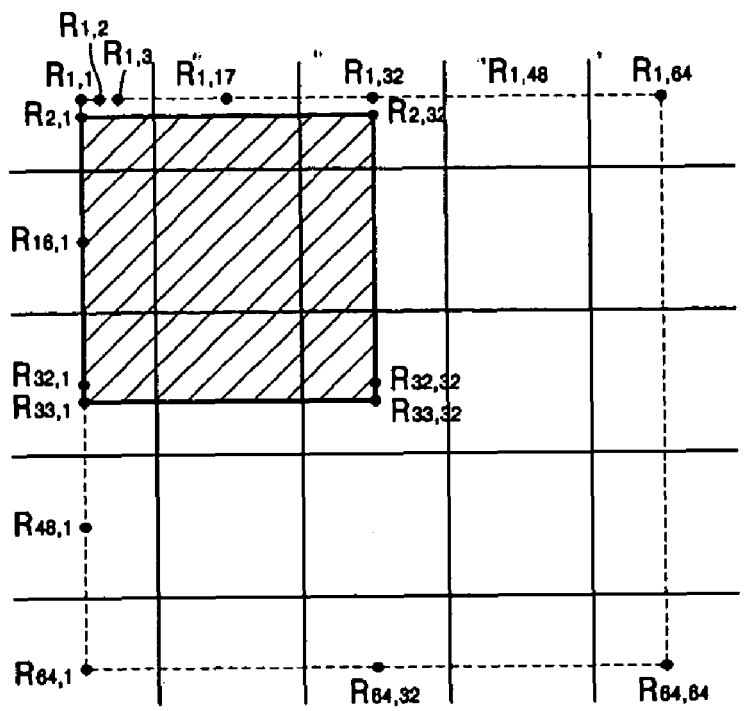
FIG. 7A illustrates the search area for the previous matching block for calculation of an SAD and a position of a search block that is moved from the first search block shown in FIG. 5A by 1 along the y-axis in the search area.
FIG. 7B illustrates an equation for calculation of an SAD based on the search block shown in FIG. 7A and the previous matching block.

FIG. 7A illustrates the search area for the previous matching block for calculation of an SAD and a position of a search block that is moved from the position of the first search block by 1 along the y-axis in the search area.

Referring to FIG. 7A, the search block that is moved from the position of the first search block by 1 along the y-axis is formed by $R_{2,1}$, $R_{2,32}$, $R_{33,1}$, and $R_{33,32}$.

FIG. 7B illustrates an equation for calculation of an SAD based on the search block shown in FIG. 7A and the previous matching block.

$$SAD(previous)_{2,1} = |S_{1,1} - R_{2,1}| + |S_{1,2} - R_{2,2}| + \ldots + |S_{1,16} - R_{2,16}|$$
$$+ |S_{1,17} - R_{2,17}| + \ldots +$$
$$|S_{1,32} - R_{2,32}| + |S_{2,1} - R_{3,1}| + |S_{2,2} - R_{3,2}| +$$
$$\ldots + |S_{2,16} - R_{3,16}| + |S_{2,17} - R_{3,17}| + \ldots +$$
$$|S_{2,32} - R_{3,32}| + \ldots + |S_{32,1} - R_{33,1}| +$$
$$|S_{32,2} - R_{33,2}| + \ldots + |S_{32,16} - R_{33,16}| +$$
$$|S_{32,17} - R_{33,17}| + \ldots |S_{32,32} - R_{33,32}|$$

Figures 8A, 8B:
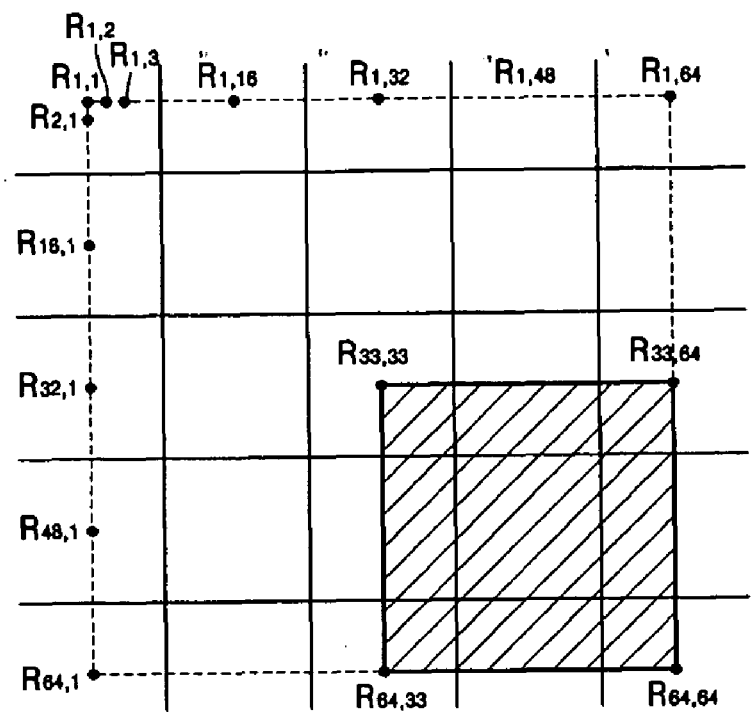
FIG. 8A illustrates the search area for the previous matching block for calculation of an SAD and a position of a last search block in the search area.
FIG. 8B illustrates an equation for calculation of an SAD based on the last search block shown in FIG. 8A and the previous matching block.

FIG. 8A illustrates the search area for the previous matching block for calculation of an SAD and a position of a last search block in the search area.

Referring to FIG. 8A, the last search block in the search area is formed by $R_{33,33}$, $R_{33,64}$, $R_{64,33}$, and $R_{64,64}$.

FIG. 8B illustrates an equation for calculation of an SAD based on the last search block shown in FIG. 8A and the previous matching block.

$$SAD(previous)_{32,32} = |S_{1,1} - R_{32,32}| + |S_{1,2} - R_{32,33}| + \ldots +$$
$$|S_{1,16} - R_{32,48}| + |S_{1,17} - R_{32,49}| + \ldots +$$
$$|S_{1,32} - R_{32,64}| + |S_{2,1} - R_{33,32}| + |S_{2,2} - R_{33,33}| +$$
$$\ldots + |S_{2,16} - R_{33,48}| + |S_{2,17} - R_{33,49}| + \ldots +$$
$$|S_{2,32} - R_{33,64}| + \ldots + |S_{32,1} - R_{64,32}| +$$
$$|S_{32,2} - R_{64,33}| + \ldots + |S_{32,16} - R_{64,48}| +$$
$$|S_{32,17} - R_{64,49}| + \ldots + |S_{32,32} - R_{64,64}|$$

Figures 9A, 9B:
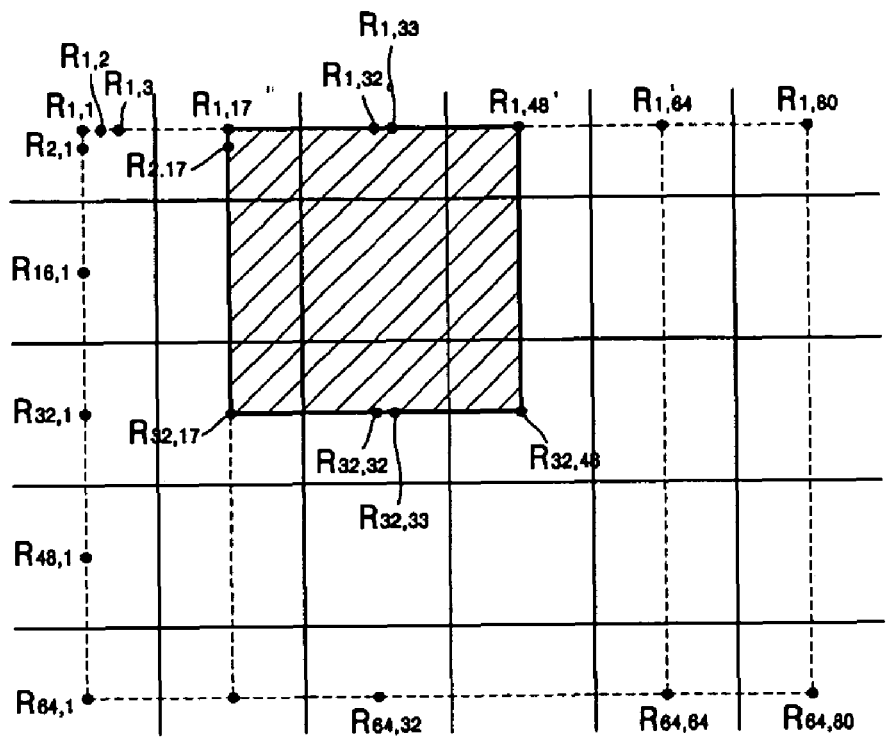
FIG. 9A illustrates a search area for a current matching block for calculation of an SAD and a position of a first search block in the search area.
FIG. 9B illustrates an equation for calculation of an SAD based on the first search block shown in FIG. 9A and the current matching block.

FIGS. 9A-through 12B illustrate positions of search blocks in a search area for a current matching block and SADs according to the positions.

FIG. 9A illustrates a search area for a current matching block for calculation of an SAD and a position of a first search block in the search area.

Referring to FIG. 9A, the search area for the current matching block is formed by $R_{1,17}$, $R_{1,80}$, $R_{64,17}$, and $R_{64,80}$ and the first search block that is first searched in the search area is formed by $R_{1,17}$, $R_{1,48}$, $R_{32,17}$, and $R_{32,48}$.

FIG. 9B illustrates an equation for calculation of an SAD based on the first search block shown in FIG. 9A and the current matching block.

$$SAD(current)_{1,1} = |S_{1,17} - R_{1,17}| + |S_{1,32} - R_{1,32}| + \ldots +$$
$$|S_{1,33} - R_{1,33}| + |S_{1,48} - R_{1,48}| + \ldots +$$
$$|S_{1,17} - R_{2,17}| + |S_{2,32} - R_{2,32}| + |S_{2,33} - R_{2,33}| +$$
$$\ldots + |S_{2,48} - R_{2,48}| + \ldots + |S_{32,17} - R_{32,17}| + \ldots +$$
$$|S_{32,32} - R_{32,32}| + |S_{32,33} - R_{32,33}| + \ldots +$$
$$|S_{32,48} - R_{32,48}|$$

Figures 10A, 10B:
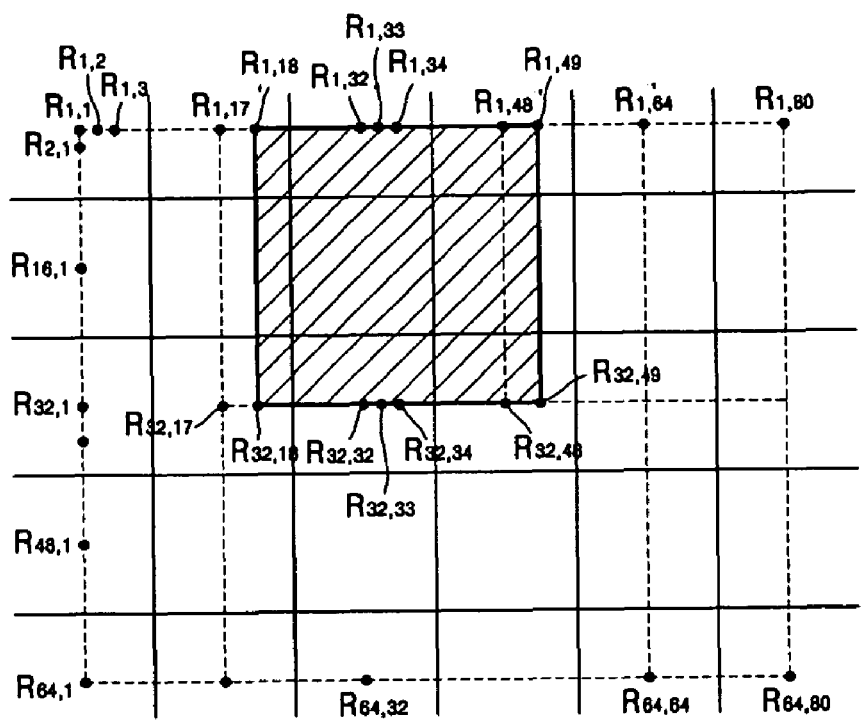
FIG. 10A illustrates the search area for the current matching block for calculation of an SAD and a position of a search block that is moved from the first search block by 1 along the x-axis in the search area.
FIG. 10B illustrates an equation for calculation of an SAD based on the search block shown in FIG. 10A and the current matching block.

FIG. 10A illustrates the search area for the current matching block for calculation of an SAD and a position of a search block that is moved from the position of the first search block by 1 along the x-axis in the search area.

Referring to FIG. 10A, the search block that is moved from the position of the first search block by 1 along the x-axis direction is formed by $R_{1,18}$, $R_{1,49}$, $R_{32,18}$, and $R_{32,49}$.

FIG. 10B illustrates an equation for calculation of an SAD based on the search block shown in FIG. 10A and the current matching block.

$$SAD(current)_{1,2} = |S_{1,17} - R_{1,18}| + \ldots + |S_{1,32} - R_{1,33}| +$$
$$|S_{1,33} - R_{1,34}| + \ldots + |S_{1,48} - R_{1,49}| +$$
$$|S_{2,17} - R_{32,18}| + \ldots + |S_{2,32} - R_{2,33}| +$$
$$|S_{2,33} - R_{2,34}| + \ldots + |S_{2,48} - R_{2,49}| + \ldots +$$
$$|S_{32,17} - R_{32,18}| + \ldots + |S_{32,32} - R_{32,33}| +$$
$$|S_{32,33} - R_{32,34}| + \ldots + |S_{32,48} - R_{32,49}|$$

Figures 11A, 11B:
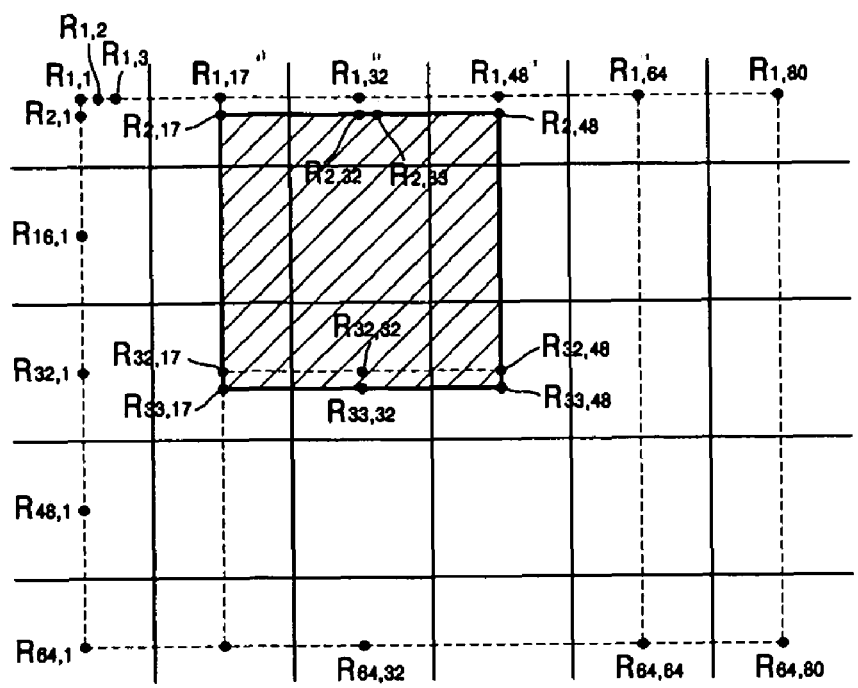
FIG. 11A illustrates the search area for the current matching block for calculation of an SAD and a position of a search block that is moved from the first search block by 1 along the y-axis in the search area.
FIG. 11B illustrates an equation for calculation of an SAD based on the search block shown in FIG. 11A and the current matching block.

FIG. 11A illustrates the search area for the current matching block for calculation of an SAD and a position of a search block that is moved from the position of the first search block by 1 along the y-axis in the search area.

Referring to FIG. 11A, the search block that is moved from the position of the first search block by 1 along the y-axis is formed by $R_{2,17}$, $R_{2,48}$, $R_{33,17}$, and $R_{33,48}$.

FIG. 11B illustrates an equation for calculation of an SAD based on the search block shown in FIG. 11A and the current matching block.

$$SAD(current)_{2,1} = |S_{1,17} - R_{2,17}| + \ldots + |S_{1,32} - R_{2,32}| +$$
$$|S_{1,33} - R_{2,33}| + \ldots + |S_{1,48} - R_{2,48}| +$$
$$|S_{2,17} - R_{3,17}| + \ldots + |S_{2,32} - R_{3,32}| +$$
$$|S_{2,33} - R_{3,33}| + \ldots + |S_{2,48} - R_{3,48}| + \ldots +$$
$$|S_{32,17} - R_{33,17}| + \ldots + |S_{32,32} - R_{33,32}| +$$
$$|S_{32,33} - R_{33,33}| + \ldots + |S_{32,48} - R_{33,48}|$$

Figures 12A, 12B:
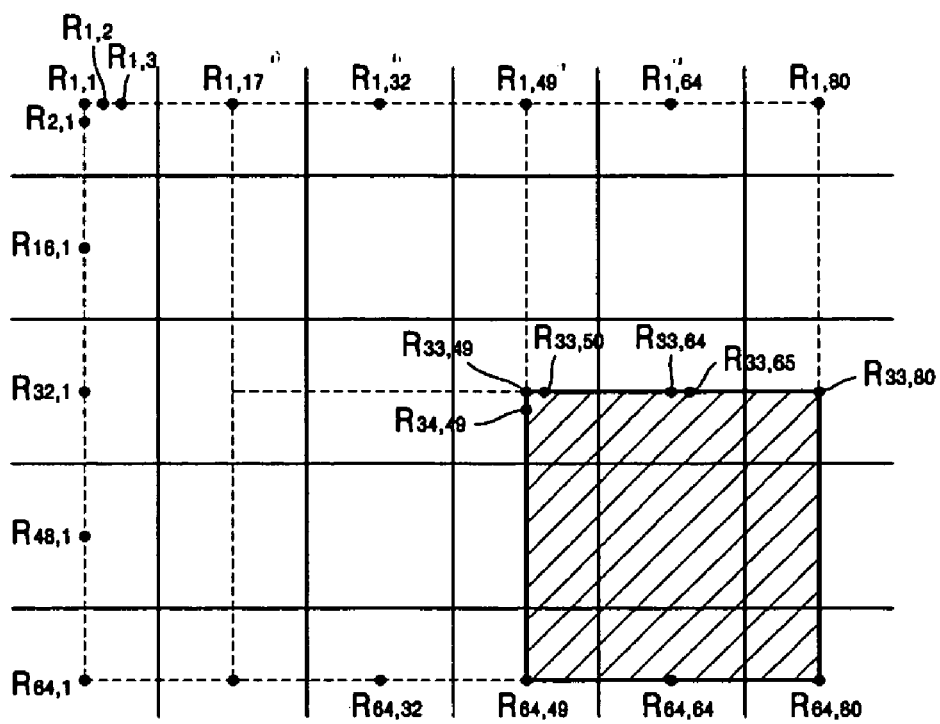
FIG. 12A illustrates the search area for the current matching block for calculation of an SAD and a position of a last search block in the search area.
FIG. 12B illustrates an equation for calculation of an SAD based on the last search block shown in FIG. 12A and the current matching block.

FIG. 12A illustrates the search area for the current matching block for calculation of an SAD and a position of a last search block in the search area.

Referring to FIG. 12A, the last search block in the search area is formed by $R_{33,49}$, $R_{33,80}$, $R_{64,49}$, and $R_{64,80}$.

FIG. 12B illustrates an equation for calculation of an SAD based on the last search block shown in FIG. 12A and the current matching block.

$$SAD(current)_{32,32} = |S_{1,17} - R_{33,49}| + \ldots + |S_{1,32} - R_{33,64}| +$$
$$|S_{1,33} - R_{33,65}| + \ldots + |S_{1,48} - R_{33,80}| +$$
$$|S_{2,17} - R_{34,49}| + \ldots + |S_{2,32} - R_{34,64}| +$$
$$|S_{2,33} - R_{34,65}| + \ldots + |S_{2,48} - R_{34,80}| + \ldots +$$
$$|S_{32,17} - R_{64,49}| + \ldots + |S_{32,32} - R_{64,64}| +$$
$$|S_{32,33} - R_{64,65}| + \ldots + |S_{32,48} - R_{64,80}|$$

From comparisons between the SADs for the previous matching block and the current matching block, it can be seen that a half of an equation for calculation of each SAD is common between the previous matching block and the current matching block as shown in FIG. 13.

Referring to FIG. 13, a right half of the equation for the SAD (previous) is the same as a left half of the SAD (current).

In other words, a right half 1310 of SAD(previous)1,1 is the same as a left half 1315 of SAD(current)$_{1,1}$, a right half 1330 of SAD(previous)$_{1,2}$ is the same as a left half 1335 of SAD(current)$_{1,2}$, a right half 1350 of SAD(previous)$_{2,1}$ is the same as a left half 1355 of SAD(current)$_{2,1}$, and a right half 1370 of SAD(previous)$_{32,32}$ is the same as a left half 1375 of SAD(current)$_{32,32}$.

Thus, instead of calculating all the items of an equation for a current SAD, a calculated right half of a previous SAD is stored, and only a right half of the current SAD is calculated and a left half of the current SAD is substituted by the stored right half of the previous SAD, thereby performing calculation rapidly while reducing hardware.

Figure 14:
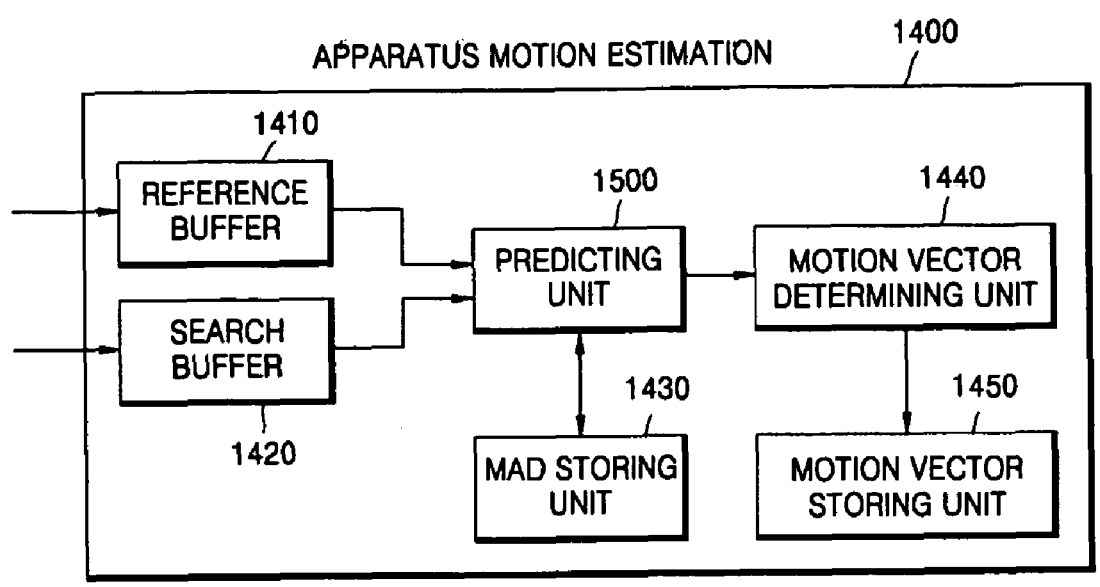
FIG. 14 is an exemplary schematic block diagram of an apparatus for motion estimation according to the present invention.

FIG. 14 is an exemplary schematic block diagram of an apparatus for motion estimation according to the present invention.

Referring to FIG. 14, an apparatus 1400 for motion estimation includes a reference buffer 1410, a search buffer 1420, a predicting unit 1500, a mean of absolute differences (MAD) storing unit 1430, a motion vector determining unit 1440, and a motion vector storing unit 1450.

The reference buffer 1410 stores a reference frame that is a current input image frame. Pixels in a matching block of the reference frame are divided into luminance components and chrominance components, and the reference buffer 1410 stores only the luminance components. A matching block extracted from the reference frame stored in the reference buffer 1410 is input to the predicting unit 1500.

The search buffer 1420 stores a previous frame that is adjacent to the reference frame stored in the reference buffer 1410. The search buffer 1420 stores luminance components of all the pixels in a search area for motion estimation of a current frame. A search area extracted from the search (previous) frame stored in the search buffer 1420 is input to the predicting unit 1500.

The predicting unit 1500 calculates an MAD for a right half of a current matching block using the matching block from the reference buffer 1410 and a block of the search area from the search buffer 1420, receives an MAD for a right half of a previous matching block (corresponding to a left half of the current matching block) from the MAD storing unit 1430, adds the MAD for the right half of the current matching block and the MAD for the left half of the current matching block to obtain a final MAD, and outputs the final MAD to the motion vector determining unit 1440. The predicting unit 1500 stores the calculated MAD for the right half of the current matching block in the MAD storing unit 1430 for use in calculation of an MAD for a next matching block.

The motion vector determining unit 1440 receives 32×32 MADs from the predicting unit 1500, determines a search block having the smallest MAD among the received MADs, calculates a motion vector of the determined search block, and stores the calculated motion vector in the motion vector storing unit 1450.

The motion vector storing unit 1450 stores motion vectors determined by the motion vector determining unit 1440.

Figure 15:
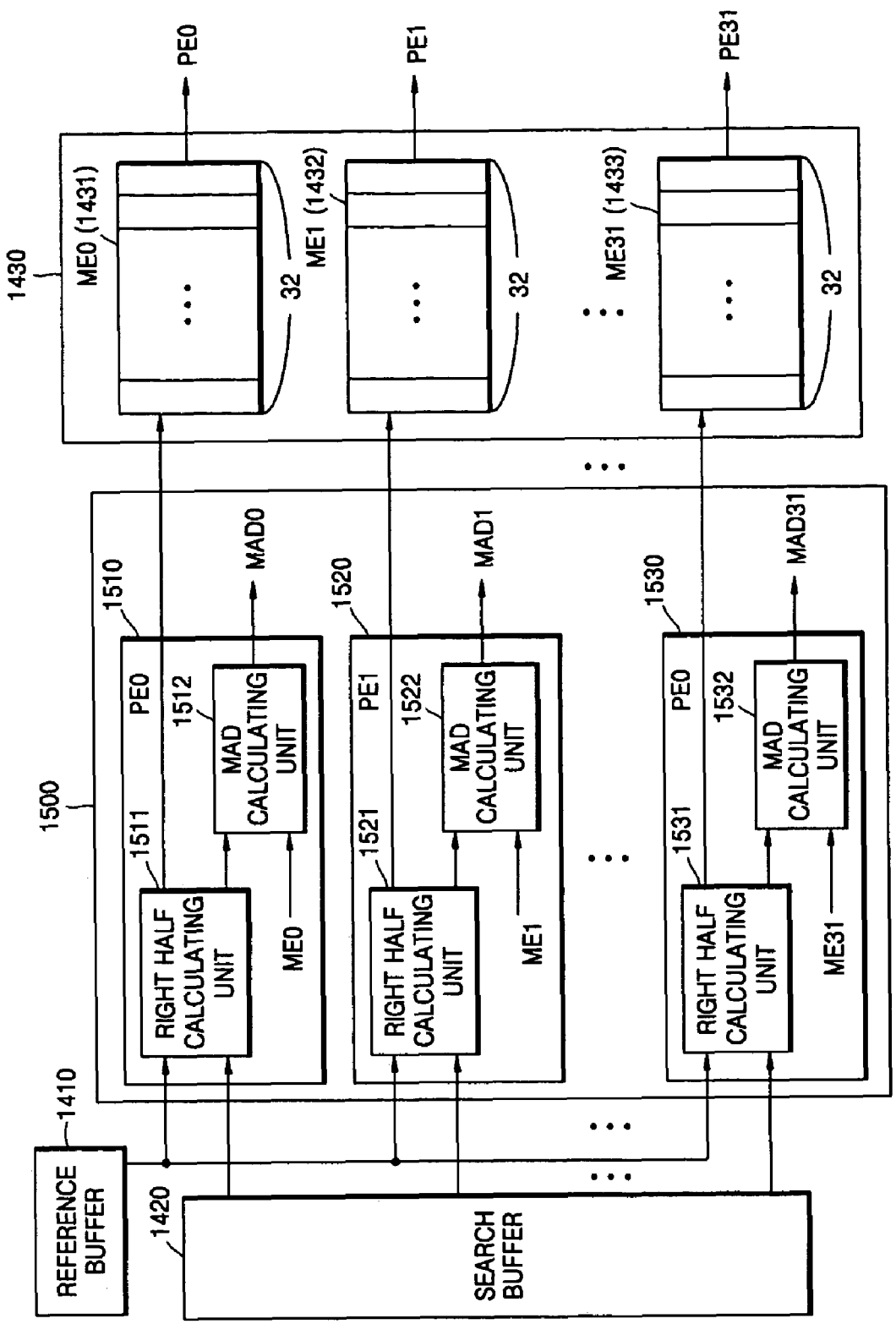
FIG. 15 is an exemplary detailed block diagram of a predicting unit and a mean of absolute differences (MAD) storing unit that are shown in FIG. 14.

FIG. 15 is an exemplary detailed block diagram of the predicting unit 1500 and the MAD storing unit 1430 shown in FIG. 14.

Referring to FIG. 15, the predicting unit 1500 includes a total of 32 prediction elements including a first prediction element 1510, a second prediction element 1520, . . . , and a thirty-second prediction element 1530.

Since each of the 32 prediction elements included in the predicting unit 1500 calculates an MAD for at least one of search blocks in a search area and the 32 prediction elements operate simultaneously, MADs for 32 search blocks are calculated at a time. Thus, for example, to calculate MADs for search blocks in the search area as shown in FIG. 5A, a total of 32 calculations are required. In other words, in a first calculation, the first prediction element 1510 calculates $MAD_{1,1}$, the second prediction element 1520 calculates $MAD_{1,2}$, and the thirty-second prediction element 1530 calculates $MAD_{1,32}$, and a total of 32 MADs calculated are output to the motion vector determining unit 1440 at a time. In a second calculation, the first prediction element 1510 calculates $MAD_{2,1}$, the second prediction element 1520 calculates $MAD_{2,2}$, and the thirty-second prediction element 1530 calculates $MAD_{2,32}$, and a total of 32 MADs calculated are output to the motion vector determining unit 1440 at a time. Through 32 calculations performed in this way, MADs for 32×32 search blocks can be obtained.

The right half calculation unit 1511 receives a matching block from the reference buffer 1410 and a search block from the searching buffer 1420, calculates a right half of an SAD based on the received matching block and search block, and calculates an MAD by performing an operation such as a shift on the calculated right half of the SAD. The right half calculation unit 1511 outputs the calculated partial MAD to the MAD calculation unit 1512 and to the MAD storing unit 1430 to store the same for use in calculation of an MAD for a next matching block.

The MAD calculation unit 1512 receives the MAD for the right half for the current matching block from the right half calculation unit 1511, reads an MAD for a right half for a previous matching block, i.e., an MAD for a left half for a current matching block, from the MAD storing unit 1430, adds the received MAD and the read MAD, and outputs the result of the addition to the motion vector determining unit 1440.

The MAD storing unit 1430 includes a total of 32 memory elements including a first memory element 1431, a second memory element 1432, . . . , and a thirty-second memory element 1433. Each of the 32 memory elements is composed of a total of 32 memory cells that store 32 MADs. For example, an MAD stored in a memory element at a predetermined clock time is input to the MAD calculation unit 1512 after 32 calculations for use in calculation of an MAD for a next matching block.

Operations of the predicting unit 1500 and the MAD storing unit 1430 will now be described with reference to FIGS. 13 and 15.

The MAD storing unit 1430 stores MADs for a previous matching block. The right half of $MAD_{1,1}$, which is calculated by performing an operation such as a shift on the right half 1310 of an SAD, is stored in a first memory cell of the first memory element 1431, the right half of $MAD_{1,2}$, which is calculated by performing an operation such as a shift on the right half 1330 of an SAD, is stored in a first memory cell of the second memory element 1432, and the right half of $MAD_{1,32}$, which is calculated by performing an operation such as a shift on the right half 1350 of an SAD, is stored in a first memory cell of the thirty-second memory element 1433.

In calculation of MADs for a current matching block, the right half calculation unit 1511 of the first prediction element 1510 calculates a right half of 1320 $MAD_{1,1}$ and outputs the calculated right half 1320 to the MAD calculation unit 1512, and the MAD calculation unit 1512 adds the received right half 1320 and the left half 1315 read from the first memory element 1431 to obtain MAD0. Similarly, other second through thirty-second prediction elements obtain and output MADs.

In the present invention where a half of a previously calculated MAD is used for motion estimation, the amount of computation can be reduced through overlapping block-based motion estimation (OBME) using sampled pixels of a matching block for motion estimation.

In OBME, motion estimation is performed using a matching (ME) block that is larger than a motion compensation (MCI) block. The important point is that a matching block composed of sampled pixels is used for motion estimation to reduce the amount of computation.

Figure 16:
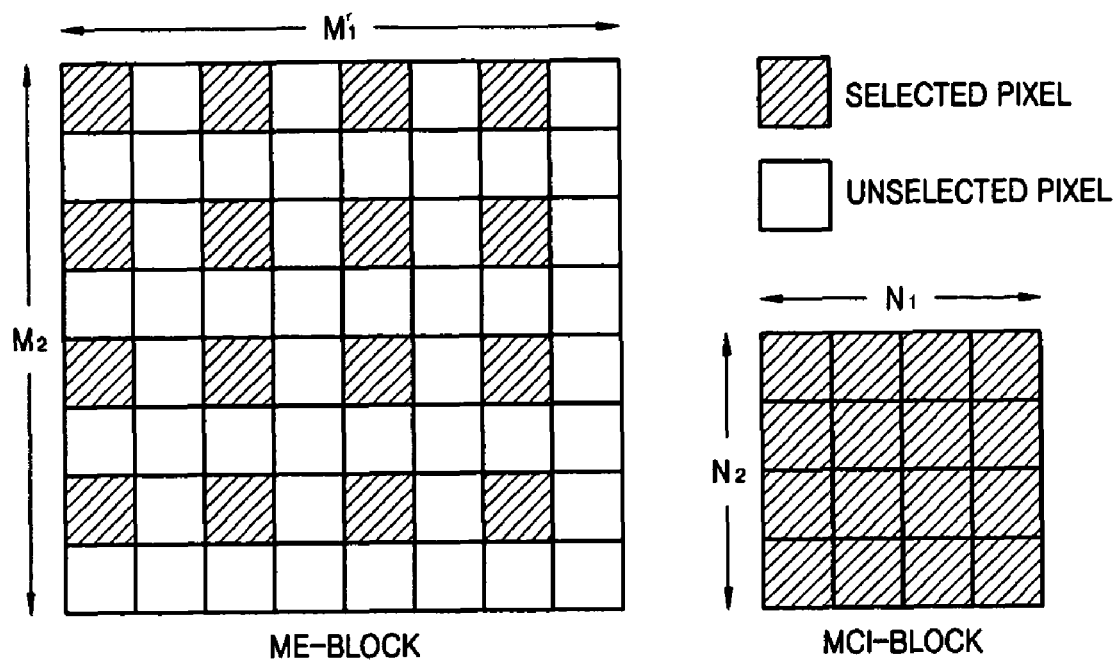
FIG. 16 is a view for explaining sampling of pixels used for SAD calculation from a matching block to reduce the amount of computation according to the present invention.

Referring to FIG. 16, a matching block has a size of 32×32 pixels and a motion compensation block has a size of 16×16 pixels. A sampling rate of the matching block is assumed to be ¼. Thus, the number of valid pixels of the matching block is 16×16. The sampling rate can be changed if necessary. A change in the sampling rate may require a change in a design, but does not change the basic principle of a design method.

To confirm that the amount of computation can be reduced through sampling of the matching block, a principle where the matching block is 2:1 sampled will now be described.

An SAD for a previous matching block is given by $$SAD_{(k,l)}(x, y) = \sum_{i=1}^{16} \sum_{j=1}^{16} \left| f_n\begin{pmatrix} k+2i+x, \\ l+2j+y \end{pmatrix} - f_{n-1}\begin{pmatrix} k+2i, \\ l+2j \end{pmatrix} \right|$$

An SAD for the current matching block is given by $$SAD_{(k+16,l)}(x, y) = \sum_{i=1}^{16} \sum_{j=1}^{16} \left| f_n\begin{pmatrix} k+16+2i+x, \\ l+2j+y \end{pmatrix} - f_{n-1}\begin{pmatrix} k+2i, \\ l+2j \end{pmatrix} \right|$$

A result of subtracting the SAD for the previous matching block from the SAD for the current matching block can be given by $$SAD_{(k+16,l)}(x, y) - SAD_{(k,l)}(x, y) = \sum_{i=1}^{16} \sum_{j=1}^{16} S_{(i,j)}(k+16, l) - \sum_{i=1}^{16} \sum_{j=1}^{16} S_{(i,j)}(k, l)$$

if, $$S_{(i,j)}(k, l) \equiv |f_n(k+2i+x, l+2j+y) - f_{n-1}(k+2i, l+2j)|$$

$$S_{(i,j)}(k+16, l) = \left| f_n\begin{pmatrix} k+16+2i+x, \\ l+2j+y \end{pmatrix} - f_{n-1}\begin{pmatrix} k+16+2i, \\ l+2j \end{pmatrix} \right|$$

$$= \left| f_n\begin{pmatrix} k+2(8+i)+x, \\ l+2j+y \end{pmatrix} - f_{n-1}\begin{pmatrix} k+2(8+i), \\ l+2j \end{pmatrix} \right|$$

$$= S_{(i+8,j)}(k, l)$$

Thus, the result can be arranged and developed as follows.

$$SAD_{(k+16,l)}(x, y) - SAD_{(k,l)}(x, y) = \sum_{i=1}^{16} \sum_{j=1}^{16} S_{(i,j)}(k+16, l) -$$

$$\sum_{i=1}^{16} \sum_{j=1}^{16} S_{(i,j)}(k, l)$$

$$= \sum_{i=1}^{16} \sum_{j=1}^{16} S_{(i+8,j)}(k, l) -$$

$$\sum_{i=1}^{16} \sum_{j=1}^{16} S_{(i,j)}(k, l)$$

$$= \sum_{m=9}^{24} \sum_{j=1}^{16} S_{(m,j)}(k, l) -$$

$$\sum_{i=1}^{16} \sum_{j=1}^{16} S_{(i,j)}(k, l)$$

$$= \sum_{i=17}^{24} \sum_{j=1}^{16} S_{(i,j)}(k, l) -$$

$$\sum_{i=1}^{8} \sum_{j=1}^{16} S_{(i,j)}(k, l)$$

$$\because \sum_{m=9}^{24} \sum_{j=1}^{16} S_{(m,j)}(k, l) = \sum_{m=17}^{24} \sum_{j=1}^{16} S_{(m,j)}(k, l) + \sum_{m=9}^{16} \sum_{j=1}^{16} S_{(m,j)}(k, l)$$

$$\sum_{i=1}^{16} \sum_{j=1}^{16} S_{(i,j)}(k, l) = \sum_{i=1}^{8} \sum_{j=1}^{16} S_{(i,j)}(k, l) + \sum_{i=9}^{16} \sum_{j=1}^{16} S_{(i,j)}(k, l)$$

$$SAD_{(k+16,l)}(x, y) = SAD_{(k,l)}(x, y) + \sum_{i=17}^{24} \sum_{j=1}^{16} S_{(i,j)}(k, l) - \sum_{i=1}^{8} \sum_{j=1}^{16} S_{(i,j)}(k, l)$$

Thus, by re-arranging the above equation, the SAD for the current matching block can be divided into a part 1 and a part 2 as follows.

$$\therefore SAD_{(k+16,l)}(x, y) = \underbrace{\sum_{i=9}^{16} \sum_{j=1}^{16} S_{(i,j)}(k, l)}_{PART\ 1} - \underbrace{\sum_{i=17}^{24} \sum_{j=1}^{16} S_{(i,j)}(k, l)}_{PART\ 2}$$

As can be seen from the above equation, the part 1 is a left half of the SAD for the current matching block and the part 2 is a right half of the SAD for the current matching block.

The part 1 which is the left half of the SAD for the current matching block, corresponds to a right half of the SAD for the previous matching block. Thus, like a case where the matching block is not 2:1 sampled, a result of calculation of the right half of the SAD for the previous matching block is stored and the stored result is used for calculation of the SAD for the current matching block.

As described above, according to the present invention, a match difference obtained for a previous matching block is used for calculation of a match difference for a current matching block, thereby reducing the amount of computation and hardware resources required for motion estimation.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A method for motion estimation, the method comprising:
   storing an interblock match difference calculated for a portion of a previous matching block to be motion estimated which is overlapped with a current matching block to be motion estimated;
   calculating an interblock match difference for the current matching block to be motion estimated by adding the interblock match difference which is stored and an interblock match difference calculated for a portion of the current matching block which is not overlapped with the previous matching block; and
   performing motion estimation on the current matching block using the interblock match difference calculated for the current matching block.

2. The method of claim 1, wherein the previous matching block or the current matching block is larger than a block to be motion compensated.

3. The method of claim 1, wherein the interblock match difference for the current matching block or the previous matching block is calculated by sampling pixels from the current matching block or the previous matching block.

4. A method for motion estimation, the method comprising:
   reading a half of an interblock match difference for a previous matching block from a memory;
   calculating a half of an interblock match difference for a current matching block to be motion estimated;
   adding the read half and the calculated half to determine the interblock match difference for the current matching block; and
   performing motion estimation on the current matching block using the interblock match difference.

5. The method of claim 4, wherein the previous matching block or the current matching block is larger than a block to be motion compensated.

6. The method of claim 4, wherein the interblock match difference for the current matching block or the pervious matching block is calculated by sampling pixels from the current matching block or the previous matching block.

7. The method of claim 4, wherein the performing the motion estimation comprises:
   determining a search block having a smallest interblock match difference among interblock match differences obtained in an entire search area; and
   determining a motion vector based on the determined search block.

8. The method of claim 4, wherein each of the read half and the calculated half is a right half.

9. An apparatus for motion estimation, the apparatus comprising:
   a storing unit which stores an interblock match difference calculated for a portion of a previous matching block to be motion estimated which is overlapped with a current matching block to be motion estimated;
   a predicting unit which calculates an interblock match difference for the current matching block to be motion estimated by adding the interblock match difference which is stored and an interblock match difference calculated for a portion of the current matching block which is not overlapped with the previous matching block; and
   a motion vector determining unit which performs motion estimation on the current matching block using the interblock match difference calculated for the current matching block.

10. The apparatus of claim 9, wherein the previous matching block or the current matching block is larger than a block to be motion compensated.

11. The apparatus of claim 9, wherein the predicting unit calculates the interblock match difference for the current matching block or the previous matching block by sampling pixels from the current matching block or the previous matching block.

12. The apparatus of claim 9, wherein the predicting unit stores the calculated interblock match difference for the current matching block in an interblock match storing unit, and wherein the motion vector determining unit calculates a motion vector and stores the calculated motion vector in a motion vector storing unit.

13. An apparatus for motion estimation, the apparatus comprising:
   a match difference storing unit which stores a half of an interblock match difference for a previous matching block;
   a predicting unit which calculates a half of an interblock match difference for a current matching block to be motion estimated and adds the stored half and the calculated half to determine the interblock match difference for the current matching block; and
   a motion vector determining unit which performs motion estimation on the current matching block using the interblock match difference.

14. The apparatus of claim 13, wherein the previous matching block or the current matching block is larger than a block to be motion compensated.

15. The apparatus of claim 13, wherein the predicting unit calculates the interblock match difference for the current matching block or the previous matching block by sampling pixels from the current matching block or the previous matching block.

16. The apparatus of claim 13, wherein the motion vector determining unit determines a search block having a smallest interblock match difference among interblock match differences obtained in an entire search area and determines a motion vector based on the determined search block.

17. The apparatus of claim 16, wherein the predicting unit stores the calculated half of the interblock match difference for the current matching block in an interblock match storing unit, and wherein the motion vector determining unit stores the motion vector in a motion vector storing unit.

18. The method of claim 13, wherein each of the read half and the calculated half is a right half.

* * * * *